(12) United States Patent
Kim et al.

(10) Patent No.: US 11,856,651 B2
(45) Date of Patent: Dec. 26, 2023

(54) PACKET GENERATION AND DISTRIBUTION METHOD FOR SUPPORTING CARRIER AGGREGATION BETWEEN BASE STATIONS, AND DEVICE THEREFOR

(71) Applicant: Samsung Electronics Co., Ltd., Suwon-si (KR)

(72) Inventors: Joondoo Kim, Seoul (KR); Hoon Huh, Yongin-si (KR); Kyoungil Min, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 250 days.

(21) Appl. No.: 17/371,845

(22) Filed: Jul. 9, 2021

(65) Prior Publication Data

US 2021/0337627 A1    Oct. 28, 2021

Related U.S. Application Data

(63) Continuation of application No. 16/488,783, filed as application No. PCT/KR2018/002487 on Feb. 28, 2018, now Pat. No. 11,064,563.

(30) Foreign Application Priority Data

Feb. 28, 2017   (KR) .................. 10-2017-0026172

(51) Int. Cl.
*H04W 80/08*   (2009.01)
*H04W 76/15*   (2018.01)
(Continued)

(52) U.S. Cl.
CPC ........... *H04W 80/08* (2013.01); *H04L 1/1874* (2013.01); *H04L 5/0055* (2013.01); *H04W 28/04* (2013.01);
(Continued)

(58) Field of Classification Search
CPC ..... H04W 80/08; H04W 28/04; H04W 28/06; H04W 72/12; H04W 76/15; H04W 80/02; H04W 88/08; H04W 28/0273; H04W 28/02; H04W 28/0278; H04L 1/1874; H04L 5/0035; H04L 47/34
(Continued)

(56) References Cited

U.S. PATENT DOCUMENTS

2004/0042491 A1   3/2004   Sarkkinen et al.
2008/0095116 A1   4/2008   Kim et al.
(Continued)

FOREIGN PATENT DOCUMENTS

KR   10-2014-0116554 A   10/2014
KR   10-2016-0073227 A   6/2016

*Primary Examiner* — Kwang B Yao
*Assistant Examiner* — Syed M Bokhari
(74) *Attorney, Agent, or Firm* — Jefferson IP Law, LLP

(57) ABSTRACT

The disclosure relates to a method and a device therefor, wherein the method is applied to CA between base stations including multiple base stations connected through non-ideal backhaul, has a master RLC pre-assign an RLC SN to a PDCP PDU and transmit the PDCP PDU to a slave RLC of each base station, and has the master RLC take full responsibility for ARQ retransmission management, thereby enabling more efficient use of a network resource and a reduction in the time spent for a retransmission.

16 Claims, 11 Drawing Sheets

(51) Int. Cl.
*H04L 1/1867* (2023.01)
*H04L 5/00* (2006.01)
*H04W 28/04* (2009.01)
*H04W 28/06* (2009.01)
*H04W 80/02* (2009.01)
*H04W 88/08* (2009.01)
*H04W 72/12* (2023.01)

(52) U.S. Cl.
CPC ........... *H04W 28/06* (2013.01); *H04W 72/12* (2013.01); *H04W 76/15* (2018.02); *H04W 80/02* (2013.01); *H04W 88/08* (2013.01)

(58) Field of Classification Search
USPC .................................................. 370/329, 328
See application file for complete search history.

(56) References Cited

U.S. PATENT DOCUMENTS

| | | | |
|---|---|---|---|
| 2012/0214445 A1 | 8/2012 | Stojanovski et al. | |
| 2013/0176988 A1 | 7/2013 | Wang et al. | |
| 2014/0056243 A1* | 2/2014 | Pelletier ................ | H04W 16/32 370/329 |
| 2014/0204771 A1 | 7/2014 | Gao et al. | |
| 2015/0326456 A1 | 11/2015 | Dudda et al. | |
| 2016/0112902 A1 | 4/2016 | Huh et al. | |
| 2016/0183158 A1* | 6/2016 | Decarreau ............. | H04L 1/1877 370/328 |
| 2016/0219594 A1* | 7/2016 | Uchino ................. | H04W 76/15 |
| 2017/0353914 A1 | 12/2017 | Jung et al. | |
| 2018/0167889 A1 | 6/2018 | Rajagopal et al. | |

* cited by examiner

PACKET GENERATION AND DISTRIBUTION METHOD FOR SUPPORTING CARRIER AGGREGATION BETWEEN BASE STATIONS, AND DEVICE THEREFOR

CROSS-REFERENCE TO RELATED APPLICATION(S)

This application is a continuation application of prior application Ser. No. 16/488,783, filed on Aug. 26, 2019, which has issued as U.S. Pat. No. 11,064,563, on Jul. 13, 2021, and which is a U.S. National Stage application under 35 U.S.C. § 371 of an International application number PCT/KR2018/002487, filed on Feb. 28, 2018, which is based on and claims priority under 35 U.S.C. § 119(a) of a Korean patent application number 10-2017-0026172, filed on Feb. 28, 2017, in the Korean Intellectual Property Office, the disclosure of each of which is incorporated by reference herein in its entirety.

TECHNICAL FIELD

The disclosure relates to a wireless communication system supporting a carrier aggregation (hereinafter referred to as a "CA"), and more particularly, to a method and apparatus for supporting an inter-site CA configured by a plurality of base station connected through a non-ideal backhaul under an RLC protocol, and particularly, to a method of generating and distributing RLC packets.

BACKGROUND ART

A communication system may be seen as a facility that enables communication between two or more devices, such as user equipments, machine type terminals, base stations and/or other nodes, by providing carriers between communication devices. A communication system may be provided by a communication network and one or more compatible communication devices, for example. Communication may include the communication of data for carrying communications, such as voices, electronic mail (e-mail), text messages, multimedia and/or content data, for example. Unlimited examples of provided services include bi-directional or multi-directional calls, data communication or multimedia services, and a data network system, for example, access to the Internet.

In a wireless system, at least some of communications between at least two stations occurs through radio interfaces. Examples of wireless systems include public land mobile networks (PLMN), satellite-based communication systems and different wireless local networks, for example, wireless local area networks (WLAN). In general, wireless systems may be divided into cells, and thus are called cellular systems. A user may access a communication system through a proper communication device or a terminal. The communication device of a user is commonly called a terminal. A communication device has a suitable signal reception and transmission device for enabling communications, for example, access to a communication network or direct communications with other users. A communication device may access a carrier provided by a station, for example, a base station of a cell and may transmit and/or receive communications on the carrier.

In general, devices associated with a communication system operate according to a given standard or specifications, describing that various entities associated with a system are allowed to perform what and how this should be achieved. In general, communication protocols and/or parameters to be used for access are also regulated. Examples of standardized radio access techniques include a global system for mobile (GSM), an enhanced data for GSM evolution (EDGE) radio access networks (GERAN), universal terrestrial radio access networks (UTRAN), and an evolved UTRAN (E-UTRAN). An example of standardized communication system architecture is long term evolution (LTE) of a universal mobile telecommunication system (UMTS) radio-access technology. LTE is standardized according to the $3^{rd}$ partnership project (3GPP). LTE uses E-UTRAN access. Various advanced stages of the 3GPP specifications are denoted as releases. Additional advancement of LTE is denoted as LTE advanced (LTE-A).

Recently, the radio communication technology has been rapidly developed, and thus the communication system technology has continued to be evolved. In order to satisfy a traffic demand that increases as the number of users in wireless communication systems is explosively increased, various technologies have been introduced. To this end, a technique introduced into the LTE system is a CA. In the existing communication, only one carrier is used between a user equipment (UE) (hereinafter referred to as a "terminal") and an evolved nodeB (eNB) (hereinafter referred to as an "base station"). In contrast, in a CA, the amount of transmission can be significantly increased as many as the number of secondary carriers using a primary carrier and one or a plurality of secondary carriers.

If different base stations transmit data through a frequency resource combination, a data transmission resource may be wasted due to latency between the base stations.

Accordingly, there is a need for a method and apparatus capable of performing a more effective CA.

DISCLOSURE OF INVENTION

Technical Problem

Various embodiments of the disclosure provide a more effective transmission and retransmission method when data transmission is performed through a CA and an apparatus using the same. Furthermore, various embodiments of this specification are to provide a structure for hierarchizing the RLC function of an base station and distributing the function to each base station in an inter-site CA in order to reduce the time taken for RLC retransmission and reduce the possibility that an automatic repeat request (ARQ) retransmission fails, and an efficient and stable method and apparatus for the generation, distribution and retransmission management of packets in the corresponding structure.

Solution to Problem

According to an embodiment of the disclosure, a data transmission method of an base station in a wireless communication system supporting a carrier aggregation may include obtaining at least one packet data convergence protocol (PDCP) packet data unit (PDU) from a PDCP layer, determining a PDCP PDU set corresponding to each of at least two radio link control (RLC) layers and an RLC sequence number (SN) corresponding to the PDCP PDU set based on the obtained PDCP PDU, and transmitting the PDCP PDU set and the RLC SN information corresponding to the PDCP PDU set to a corresponding RLC layer of the at least two RLC layers.

According to an embodiment of the disclosure, a data transmission method of an base station in a wireless communication system supporting a carrier aggregation may include obtaining, from a different base station, a packet data convergence protocol (PDCP) packet data unit (PDU) set and radio link control (RLC) sequence number (SN) information corresponding to the PDCP PDU set, and determining terminal scheduling information based on the obtained PDCP PDU set and RLC SN information corresponding to the PDCP PDU set.

According to an embodiment of the disclosure, an base station of a wireless communication system supporting a carrier aggregation may include a transceiver transmitting and receiving signals, a controller configured to control to obtain at least one packet data convergence protocol (PDCP) packet data unit (PDU) from a PDCP layer, determine a PDCP PDU set corresponding to each of at least two radio link control (RLC) layers and an RLC sequence number (SN) corresponding to the PDCP PDU set based on the obtained PDCP PDU, and transmit the PDCP PDU set and RLC SN information corresponding to the PDCP PDU set to a corresponding RLC layer of the at least two RLC layers, and a storage unit storing at least one of information related to a different base station or information transmitted and received through the transceiver.

According to an embodiment of the disclosure, an base station in a wireless communication system supporting a carrier aggregation may include a transceiver transmitting and receiving signals, a controller configured to obtain, from a different base station, a packet data convergence protocol (PDCP) packet data unit (PDU) set and radio link control (RLC) sequence number (SN) information corresponding to the PDCP PDU set and to determine terminal scheduling information based on the obtained PDCP PDU set and RLC SN information corresponding to the PDCP PDU set, and a storage unit storing at least one of information related to the different base station or information transmitted and received through the transceiver.

Advantageous Effects of Invention

According to various embodiments of the disclosure, in an inter-site CA, the RLC function of a base station is hierarchized and distributed to each base station, and the RLC SN of a PDCP PDU is previously assigned. Accordingly, a base station RLC protocol can be stably operated by excluding a status PDU loss possibility on a non-ideal backhaul, and the time taken for retransmission due to non-ideal backhaul latency upon performing the retransmission of an RLC PDU transmitted by an SCell can be reduced. Furthermore, in the case of the slave RLC of an SeNB, there is an effect in that a memory region necessary to be physically secured when the slave RLC is implemented is reduced by deleting a corresponding buffer after the initial transmission of an RLC PDU because ARQ retransmission is not performed.

MODE FOR THE INVENTION

Figure 1:
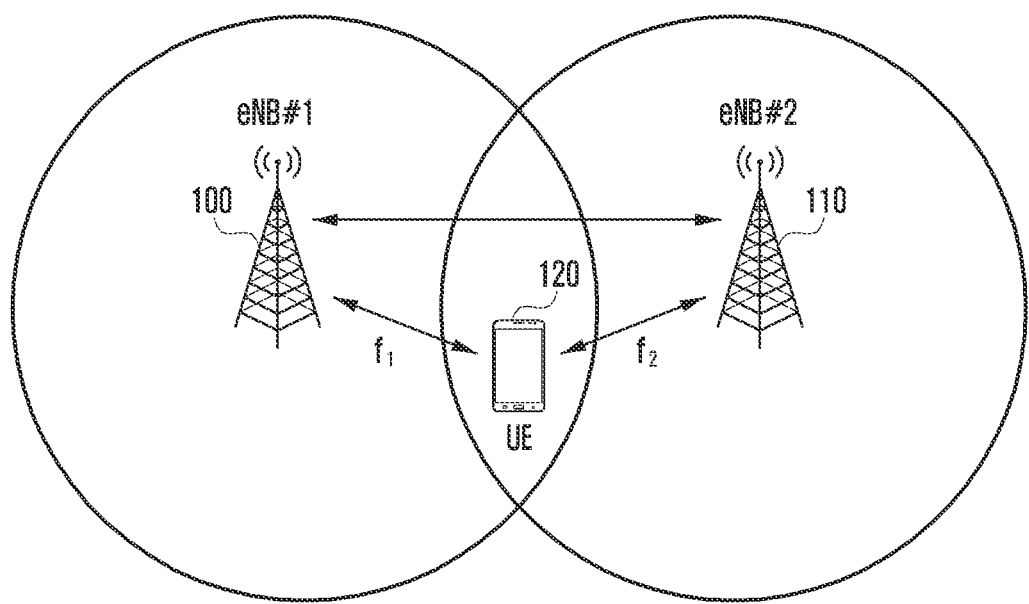
FIG. 1 is a diagram showing a schematic structure of an inter-site CA.

Hereinafter, preferred embodiments of the disclosure are described in detail with reference to the accompanying drawings. It is to be noted that the same reference numbers are used throughout the drawings to refer to the same elements. Furthermore, a detailed description of known functions or constructions that may make the gist of the disclosure vague is omitted.

Furthermore, in describing the embodiments of the disclosure in detail, an advanced E-UTRA (or called LTE-A) system supporting a CA is chiefly described, but a major gist of the disclosure may be slightly modified and applied to other communication systems having a similar technical background and a channel form without significantly departing from the range of the disclosure, which may be determined by a person having skilled technical knowledge in a corresponding technical field of the disclosure. For example, the major gist of the disclosure may be applied to multicarrier HSPA supporting a CA.

The embodiments of the disclosure disclosed in this specification and drawings have suggested given examples in order to easily describe the technical contents of the disclosure and to help understanding of the disclosure, but are not intended to limit the scope of the disclosure. It is evident to a person having ordinary skill in the art to which the disclosure pertains that other modified examples based on the technical spirit of the disclosure are possible in addition to the disclosed embodiments.

Various embodiments of the disclosure relate to a method and apparatus for a CA in a plurality of base stations, and are aimed at downlink data transmission in a wireless communication system.

A CA according to various embodiments of the disclosure may include all techniques in which different frequency resources are combined, that is, Rel-12 dual connectivity (DC), Rel-12 TDD-FDD CA, Rel-13 licensed assisted access (LAA), TDD-FDD dual connectivity, LTE-U supplement downlink (SDL), an LTE-U CA, an LTE-WLAN aggregation, and an LTE-WiFi aggregation, in addition to Rel-10 CA in 3GPP LTE specifications.

In this specification, in describing embodiments, a description of contents that are well known in the art to which the disclosure pertains and not directly related to the disclosure is omitted in order to make the gist of the disclosure clearer.

For the same reason, in the accompanying drawings, some elements are enlarged, omitted, or depicted schematically.

Furthermore, the size of each element does not accurately reflect its real size. In the drawings, the same or similar elements are assigned the same reference numerals.

The merits and characteristics of the disclosure and a method for achieving the merits and characteristics will become more apparent from the embodiments described in detail in conjunction with the accompanying drawings. However, the disclosure is not limited to the disclosed embodiments, but may be implemented in various different ways. The embodiments are provided to only complete the disclosure of the disclosure and to allow those skilled in the art to understand the category of the disclosure. The disclosure is defined by the category of the claims. The same reference numerals will be used to refer to the same or similar elements throughout the drawings.

In the disclosure, it will be understood that each block of the flowchart illustrations and combinations of the blocks in the flowchart illustrations can be executed by computer program instructions. These computer program instructions may be mounted on the processor of a general purpose computer, a special purpose computer, or other programmable data processing apparatus, so that the instructions executed by the processor of the computer or other programmable data processing apparatus create means for executing the functions specified in the flowchart block(s). These computer program instructions may also be stored in computer-usable or computer-readable memory that can direct a computer or other programmable data processing equipment to function in a particular manner, such that the instructions stored in the computer-usable or computer-readable memory produce an article of manufacture including instruction means that implement the function specified in the flowchart block(s). The computer program instructions may also be loaded on a computer or other programmable data processing apparatus to cause a series of operational steps to be performed on the computer or other programmable apparatus to produce a computer-executed process, so that the instructions performing the computer or other programmable apparatus provide steps for executing the functions described in the flowchart block(s).

Furthermore, each block of the flowchart illustrations may represent a portion of a module, a segment, or code, which includes one or more executable instructions for implementing a specified logical function(s). It should also be noted that in some alternative implementations, the functions noted in the blocks may occur out of order. For example, two blocks shown in succession may in fact be executed substantially concurrently, or the blocks may sometimes be executed in the reverse order, depending upon the functionality involved.

In this case, the term "unit," as used in the present embodiment means software or a hardware component, such as an FPGA or an ASIC, and the "unit" performs specific tasks. The "unit" may advantageously be configured to reside on an addressable storage medium and configured to operate on one or more processors. Accordingly, the "unit" may include, for example, components, such as software components, object-oriented software components, class components, and task components, processes, functions, attributes, procedures, sub-routines, segments of program code, drivers, firmware, microcode, circuitry, data, databases, data structures, tables, arrays, and variables. The functionalities provided in the components and "units" may be combined into fewer components and "units" or may be further separated into additional components and "units."

Furthermore, the components and "units" may be implemented to operate on one or more CPUs within a device or a security multimedia card.

The embodiments of the disclosure disclosed in this specification and drawings have suggested given examples in order to easily describe the technical contents of the disclosure and to help understanding of the disclosure, but are not intended to limit the scope of the disclosure. It is evident to a person having ordinary skill in the art to which the disclosure pertains that other modified examples based on the technical spirit of the disclosure are possible in addition to the disclosed embodiments.

FIG. 1 is a diagram showing a schematic structure of an inter-site CA.

Referring to FIG. 1, an eNB #1 100 and an eNB #2 110 are connected through a non-ideal backhaul. When the eNB #1 100 transmit and receives carriers having a center frequency of f1 and the eNB #2 110 transmits and receives carriers having a center frequency of f2, if a terminal 120 combines a carrier having a forward center frequency of f1 and a carrier having a forward center frequency of f2, as a result, the one terminal 120 combines the carriers transmitted to and received from the two or more eNBs 100 and 110. This is called an inter-site CA in an embodiment of the disclosure.

For example, what an inter-site CA has been configured means that a primary cell (hereinafter referred to as a "PCell") controlled by a serving base station and a secondary cell (hereinafter referred to as an "SCell") controlled by a different base station not the serving base station have been configured. The PCell and the SCell are terms indicative of the type of serving cell configured in a terminal. There are some differences between the PCell and the SCell. For example, the PCell always maintains an activation state, but the SCell repeats an activation state and a deactivation state according to an instruction from a base station. The mobility of a terminal is controlled based on a PCell, and an SCell may be understood as an additional serving cell for data transmission and reception.

Figure 2:
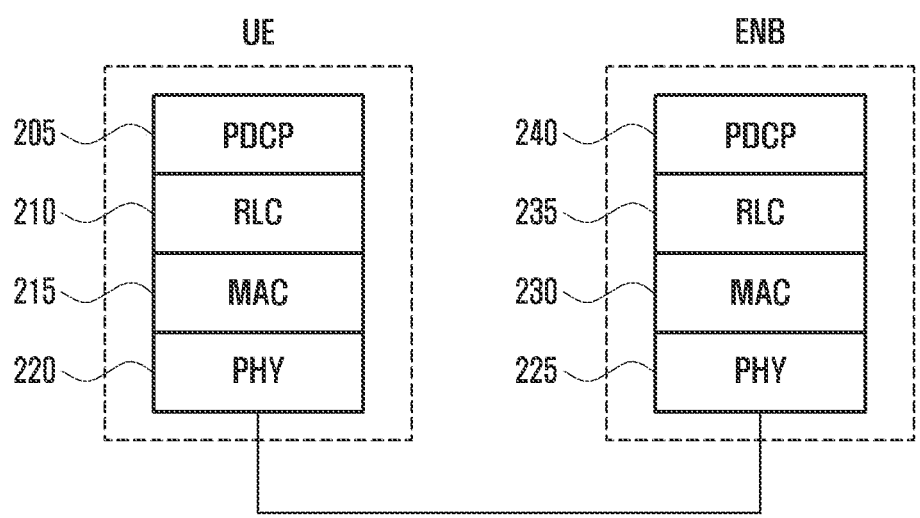
FIG. 2 is a diagram showing a radio protocol structure in the LTE system.

FIG. 2 is a diagram showing a radio protocol structure in the LTE system.

Referring to FIG. 2, the radio protocol of the LTE system is configured with PDCPs 205 and 240, radio link controls (RLC) 210 and 235, medium access controls (MAC) 215 and 230, and physicals (PHY) 220 and 225 in a terminal and a base station, respectively.

The PDCP 205, 240 is responsible for an operation, such as IP header compression/decompression.

The radio link control (hereinafter referred to as "RLC") 210, 235 re-configures a PDCP packet data unit (PDU) in a proper size and performs an ARQ operation.

The MAC 215, 230 is connected to several RLC layer devices configured in a terminal, and performs an operation of multiplexing RLC PDUs with a MAC PDU and demultiplexing RLC PDUs from a MAC PDU.

The PHY 220, 225 channel-codes and modulates higher layer data, generates the data into an OFDM symbol, and transmits the OFDM symbol to a radio channel or demodulates an OFDM symbol obtained through a radio channel, channel-decodes the demodulated symbol, and forwards the decoded symbol to a higher layer.

A CA method according to an embodiment is described below in brief.

When a CA is used, a terminal may use only one cell for each frequency. In this case, an RRC connection is performed through only one cell. Such a cell is called a PCell, and the remaining cells are called SCells. If a CA has been configured, in terms of a downlink (DL) Layer-2 structure, the characteristics of a multi-frequency appear in the MAC/PHY/RF stage. The PDCP/RLC higher than the MAC layer is not related to a CA. That is, only one PDCP and one RLC are present regardless of the number of carriers used, and the MAC/PHY/RF may be present as many as the number of carriers. However, in some embodiments, in dual connectivity (DC) in which at least two different base station resources connected through a non-ideal backhaul are obtained and used, a terminal may be connected to the PCell of MeNB that operates as a mobility anchor and the PSCell of an SeNB that is not an MeNB, but provides an additional resource.

If the CA technology is applied between different base stations (e.g., if a PCell and an SCell operates in different base stations), it may be assumed that each base station uses an RLC located in a base station that operates a PCell. In this case, signal transmission between the base station where the PCell is located and the base station where the SCell is located may be performed based on an RLC/MAC/PHY processing process because the MAC/PHY of the SCell is located in the base station different from that of the RLC. Various types of latency including X2 delay, for example, are present between different base stations. In this case, data transmission efficiency may be degraded.

Accordingly, various embodiments of the disclosure propose a method capable of efficiently using network resources through a frequency resource combination between different base stations.

Various embodiments of the disclosure may be used to efficiently use an SCell resource when a frequency resource combination is performed between different base stations to which a CA is applied, and may also be applied to all methods of combining frequency resources in different base stations in addition to a frequency resource combination between different base stations to which DC is applied.

In describing the operation of the disclosure, a first base station and a second base station are used. The base station means a device that performs communication with a terminal and a device controlling a corresponding operation. For example, it may be assumed that an RRC connection is performed through the first base station. That is, a base station that operates a PCell is named a first base station, and a base station that operates an SCell is named a second base station. Only one first base station is present for one bearer, and a plurality of second base stations may be present. One base station does not necessarily operate one cell, and one base station may operate multiple cells using multiple frequencies.

The disclosure may be applied to all techniques in which different frequency resources are combined. For example, in a CA, a first base station may be changed to a PCell and applied, and base stations may be changed to SCells and applied. In DC, a first base station may be changed to an MeNB and applied, and a second base station may be changed to an SeNB and applied.

In Rel-10 CA technology, data to be transmitted to a terminal through second base stations not having a PCell is stored in RLC positioned in a first base station having a PCell, and an RLC PDU for SCell downlink data is provided from corresponding RLC. Accordingly, there has been proposed a structure having each RLC for each base station in order to minimize a loss attributable to a non-ideal backhaul when a signal is transmitted between the RLC and the MAC.

Figure 3:
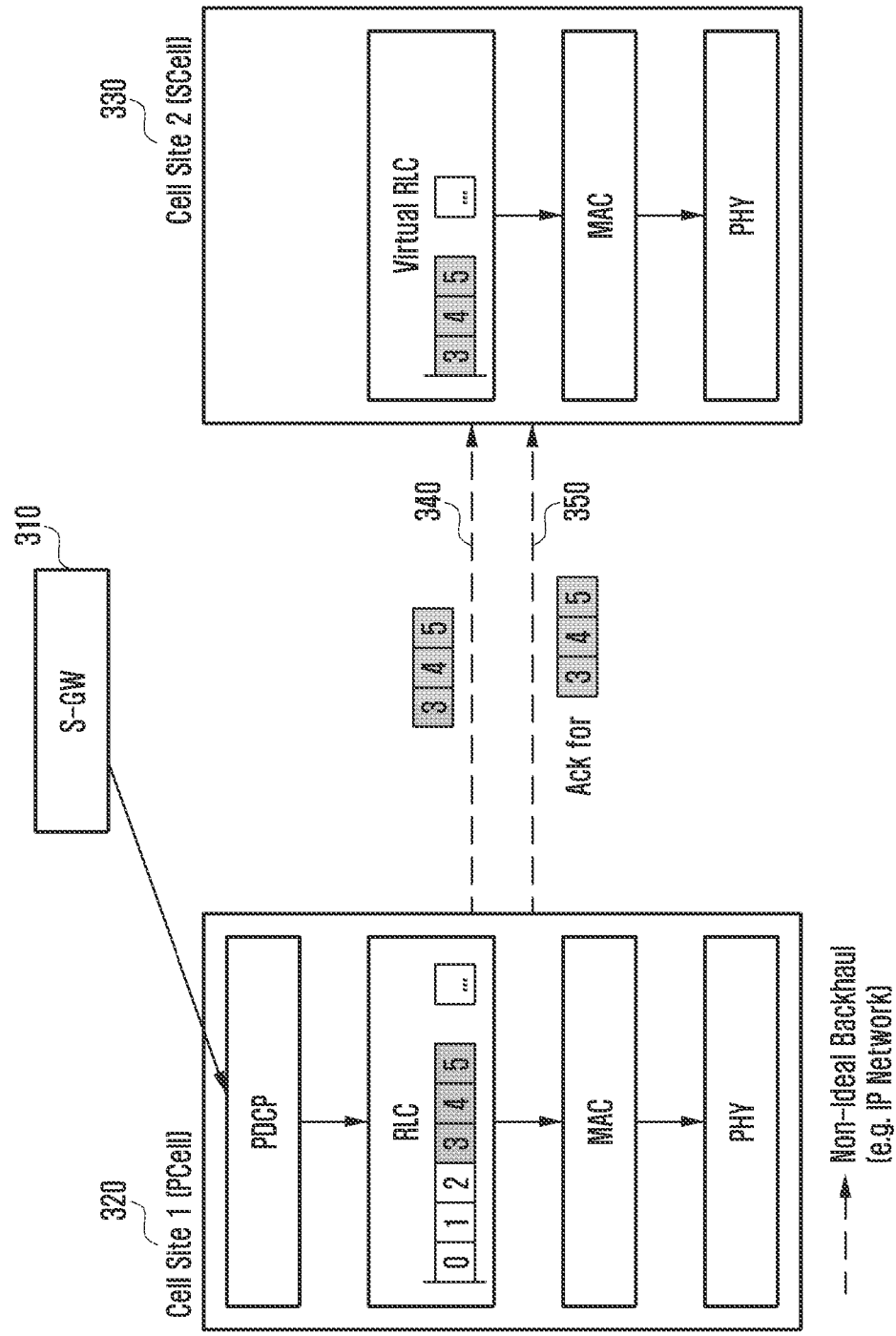
FIG. 3 is a diagram showing an example of an operation between two base stations in a wireless communication system supporting a CA.

FIG. 3 schematically shows such a technology.

Referring to FIG. 3, a communication system according to an embodiment may include a cell site 1 320 including a PCell in which an RRC connection is performed and a cell site 2 330 including an SCell. Each cell site may obtain a data packet from an S-GW 310. In an embodiment, the cell site 1 320 may obtain a data packet from the S-GW 310 and transmit it to the cell site 2 330.

The RLC of the cell site 1 320 determines the size of data to be distributed to each virtual RLC by taking into consideration a buffer occupancy (BO) size obtained from the virtual RLC of each cell site and a data rate, determines an RLC SN set to be used in a corresponding virtual RLC, and forwards data and the RLC SN set (340). As described above, the virtual RLC of the cell site 2 330 obtains data that has been previously distributed and that will be transmitted through an SCell and buffers the data so that an SCell resource can be efficiently used by reducing the influence of a non-ideal backhaul.

As described above, in an inter-site CA configured with a plurality of base stations connected through a non-ideal backhaul, if a virtual RLC obtains data to be transmitted by a corresponding cell site and an RLC SN set and independently performs RLC SN assignment when it provides an RLC data PDU, the RLC of the cell site 1 320 cannot be aware of generation information of the RLC data PDU transmitted by the virtual RLC unless it obtains separate information. Accordingly, in the case of RLC acknowledge mode (AM), if ACK/NACK for an RLC SN distributed to the virtual RLC is forwarded by a terminal, there is a need for an operation of performing ARQ retransmission or emptying a retransmission buffer by forwarding corresponding information to the corresponding virtual RLC (350). If the virtual RLC directly performs ARQ retransmission as described above, a memory region for a retransmission buffer needs to be secured because the virtual RLC has to manage the retransmission buffer. RLC retransmission timing may be delayed as much as that ACK/NACK or corresponding information forwarded to the virtual RLC is delayed on a non-ideal backhaul. Accordingly, if the ACK/NACK or corresponding information forwarded to the virtual RLC is lost on the non-ideal backhaul, this cannot be recovered on an RLC protocol unless separate information is obtained. In order to recover this, a higher protocol operation may be necessary.

Figure 4:
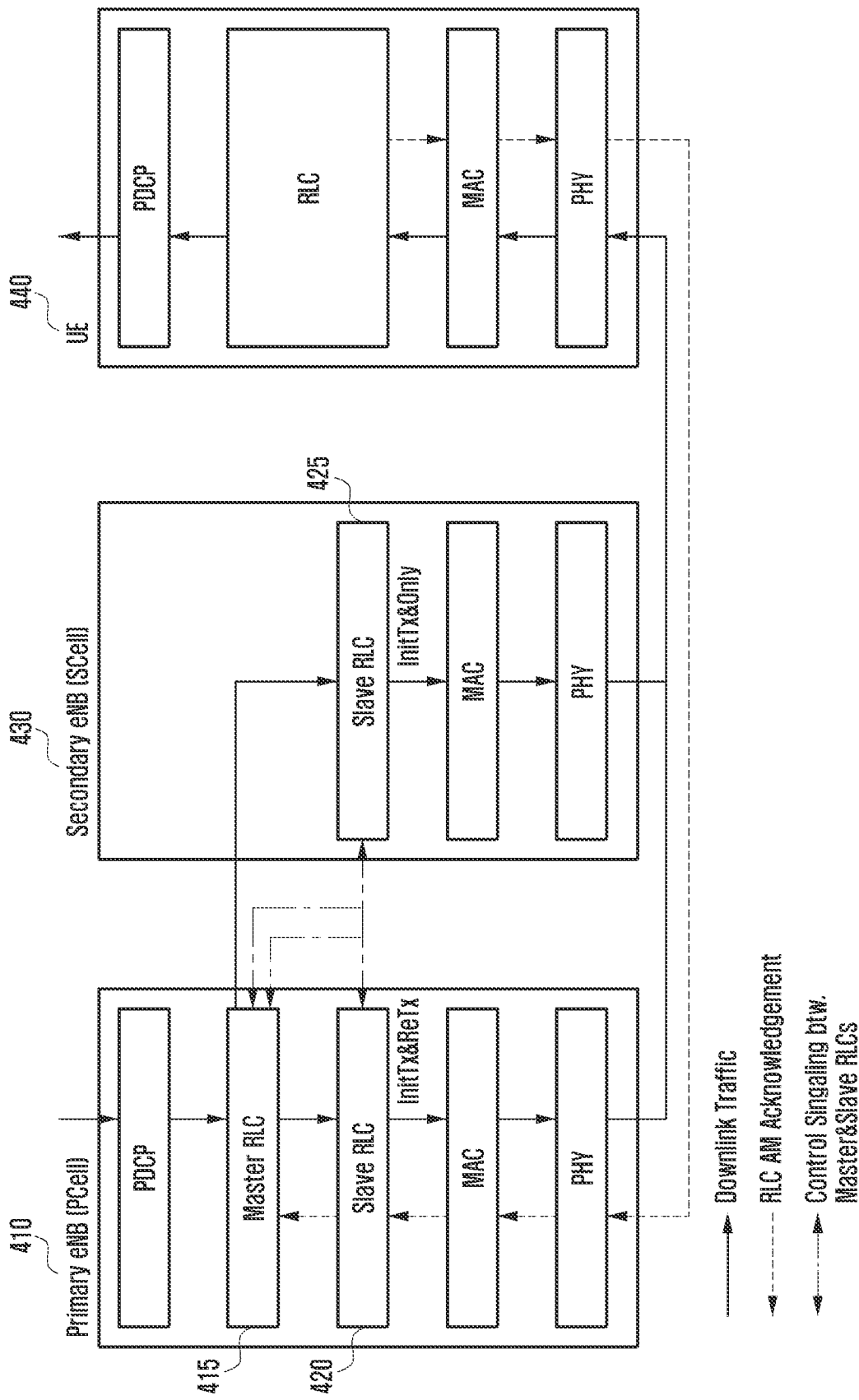
FIG. 4 is a concept view showing an operation if a frequency resource combination between base stations is applied according to an embodiment of the disclosure.

FIG. 4 is a concept view showing an operation if a frequency resource combination between base stations is applied according to an embodiment of the disclosure.

Referring to FIG. 4, a primary base station 410 and a secondary base station 430 are connected a wired or wireless network, and thus may exchange signals. A terminal 440 is connected to the primary base station 410 and the secondary base station 430 over a wireless network, and may exchange signals with them.

The primary base station 410 according to an embodiment of the disclosure may include at least one of a PDCP, a master RLC 415, a slave RLC 420, a MAC or a PHY. However, the configuration of each base station is not limited thereto and may be implemented in various ways.

The master RLC 415 of the primary base station 410 according to an embodiment of the disclosure is responsible for the management of an RLC protocol. The master RLC 415 may obtain a PDCP PDU from the PDCP, may distribute the PDCP PDU so that it is transmitted to each base station, and may assign an RLC SN to the distributed PDCP PDU. In the disclosure, a method of first allocating an SN to a PDCP PDU obtained from a PDCP before an RLC PDU is generated and forwarded to a MAC as described above is called RLC SN pre-assignment unlike the existing method. The PDCP PDU and RLC SN information assigned to the PDCP PDU are transmitted to the slave RLCs 420 and 425 of the respective base stations. An ARQ operation is performed on each base station.

The master RLC 415 may collect and manage information for determining a PDCP PDU set in which a PDCP PDU will be distributed to each base station. The information may include at least one of a BO size or data rate in each base station or latency between base stations, for example. In the disclosure, a PDCP PDU set refers to some or all of one or more PDCP PDUs, and may be used as the unit of PDCP PDU distribution or RLC SN assignment, for example.

Furthermore, the master RLC 415 may determine the size of a PDCP PDU set to which the same RLC SN is assigned in performing RLC SN assignment on a distributed PDCP PDU. For example, the size of an accumulated PDCP PDU set to which the same RLC SN is assigned may be determined every slave RLC in which a PDCP PDU will be transmitted, may be determined in proportion to the data rate of each slave RLC, or may be determined in proportion to electric field information using CQI/RI information of each serving cell that is obtained in a PCell.

The master RLC 415 according to an embodiment of the disclosure may transmit a PDCP PDU to which an RLC SN has been assigned and corresponding assignment information to the slave RLCs 420 and 425 of the respective base stations, and may store the information in a buffer for subsequent retransmission.

Furthermore, the master RLC 415 according to an embodiment of the disclosure may obtain a status PDU, including ACK/NACK, from the RLC of a UE that has obtained downlink RLC data, and may perform transmission ACK and retransmission on the status PDU.

The slave RLC 420 of the primary base station 410 collects and transmits information so that the master RLC 415 may determine downlink RLC data to be transmitted to each base station. The information may include at least one of a BO size or data rate in a corresponding base station or latency between base stations, for example.

Furthermore, the slave RLC 420 may provide an RLC PDU for downlink data to be forwarded to the terminal 440, based on a PDCP PDU obtained from the master RLC 415 and RLC SN information assigned to the PDCP PDU. The slave RLC 420 may obtain a PDCP PDU for retransmission and RLC SN assignment information from the master RLC 415 upon data retransmission, and may perform a process for retransmission.

The MAC performs an operation of multiplexing RLC PDUs with a MAC PDU and demultiplexing RLC PDUs from a MAC PDU, and performs resource allocation.

The PHY channel-codes and modulates higher layer data, generates the data into an OFDM symbol, and transmits the OFDM symbol to a radio channel or demodulates an OFDM symbol obtained through a radio channel, channel-decodes the demodulated symbol, and forwards the decoded symbol to a higher layer.

A secondary base station according to an embodiment of the disclosure may be configured with at least one of the slave RLC 425, a MAC or a PHY. However, the configuration of each base station is not limited thereto and may be implemented in various ways.

The slave RLC 425 of the secondary base station 430 collects and transmits information so that the master RLC 415 may perform an algorithm for distributing downlink RLC data to be transmitted to each base station. The information may include at least one of the BO size or data rate of a corresponding base station, for example.

Furthermore, the slave RLC 425 may provide an RLC PDU for downlink data to be transmitted to the terminal based on a PDCP PDU obtained from the master RLC 415 and RLC SN information assigned to the PDCP PDU.

The MAC performs an operation of multiplexing RLC PDUs with a MAC PDU and demultiplexing RLC PDUs from a MAC PDU, and performs resource allocation.

The PHY channel-codes and modulates higher layer data, generates the data into an OFDM symbol, and transmits the OFDM symbol to a radio channel or demodulates an OFDM symbol obtained through a radio channel, channel-decodes the demodulated symbol, and forwards the decoded symbol to a higher layer.

Figure 5:
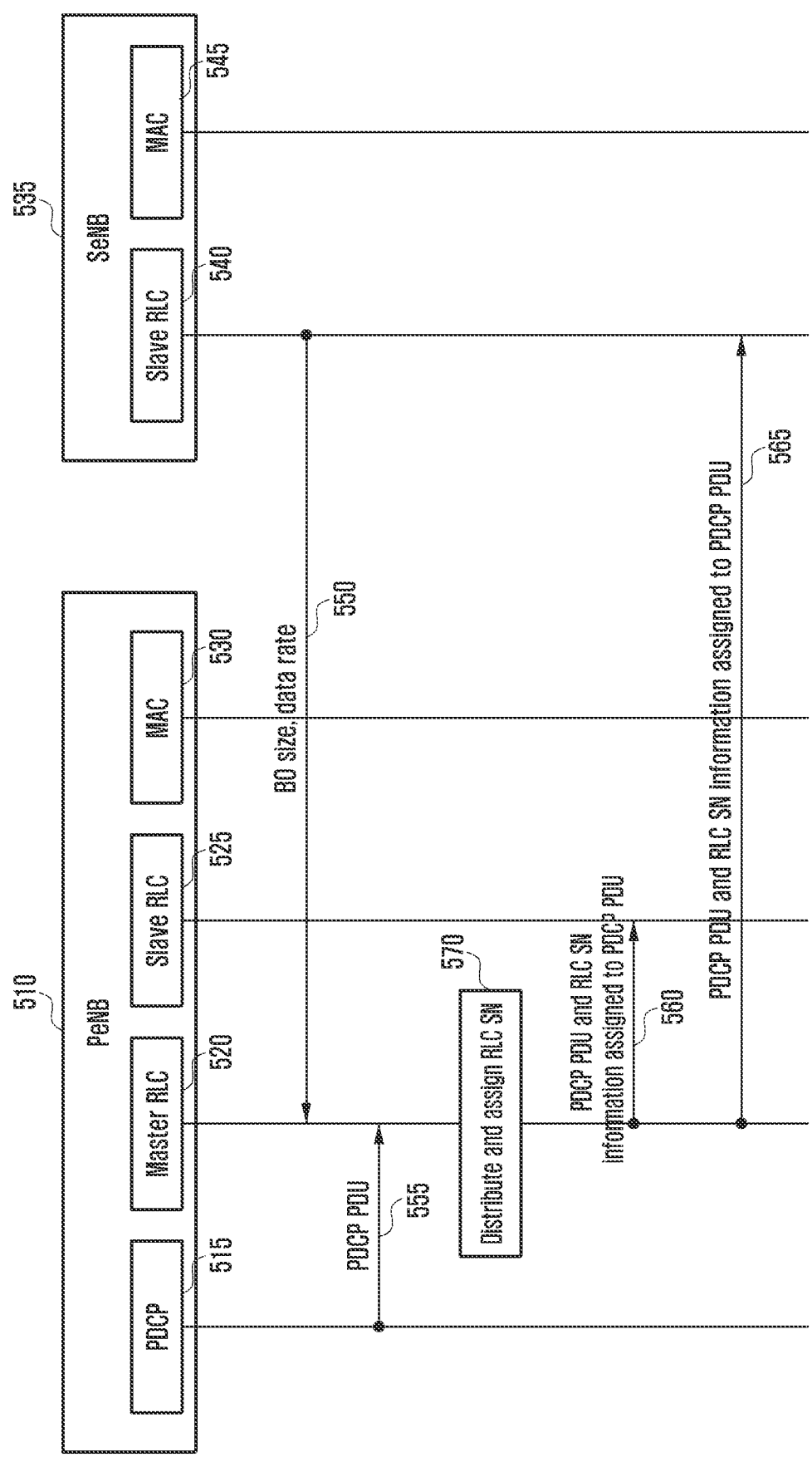
FIG. 5 is a diagram showing an operation of each base station according to an embodiment of the disclosure.

FIG. 5 is a diagram showing an operation of each base station according to an embodiment of the disclosure.

Referring to FIG. 5, a primary base station 510 may include at least one of a PDCP 515, a master RLC 520, a slave RLC 525 or a MAC 530. A secondary base station 535 may include at least one of a slave RLC 540 or a MAC 545. However, the configuration of each base station is not limited thereto and may be implemented in various ways.

The master RLC 520 of the primary base station 510 obtains information for performing a data distribution algorithm from the slave RLC 540 of the secondary base station 535 (550). The information may include at least one of a BO size or data rate in each base station, for example.

In one embodiment, the master/slave RLC structure of the disclosure may be applied to the virtualization of a base station if the reliability of a backhaul is guaranteed. In this case, a CA function can be effectively provided without being limited to a site by virtualizing and concentrating the master RLC and a PDCP on a separate network entity and distributing each base station including a slave RLC, a MAC and a PHY. If base stations are virtualized and a master RLC and a slave RLC are operated on different entities as described above, the master RLC 520 may obtain information from the corresponding slave RLC 525.

The master RLC 520 obtains a PDCP PDU from the PDCP (555), determines a PDCP PDU set to be distributed to each base station based on information (e.g., a BO size and a data rate) obtained from the slave RLC 550, and assigns an RLC SN.

The master RLC 520 transmits, to the slave RLC of each base station, the PDCP PDU allocated to each base station and the RLC SN information assigned to the PDCP PDU (560, 565).

Although not shown, the master RLC 520 may store the PDCP PDU and the RLC SN information assigned to the PDCP PDU in a buffer for retransmission. The information stored in the buffer may be deleted based on acknowledgement information (ACK) obtained from the terminal if the corresponding PDCP PDU is transmitted.

Figure 6:
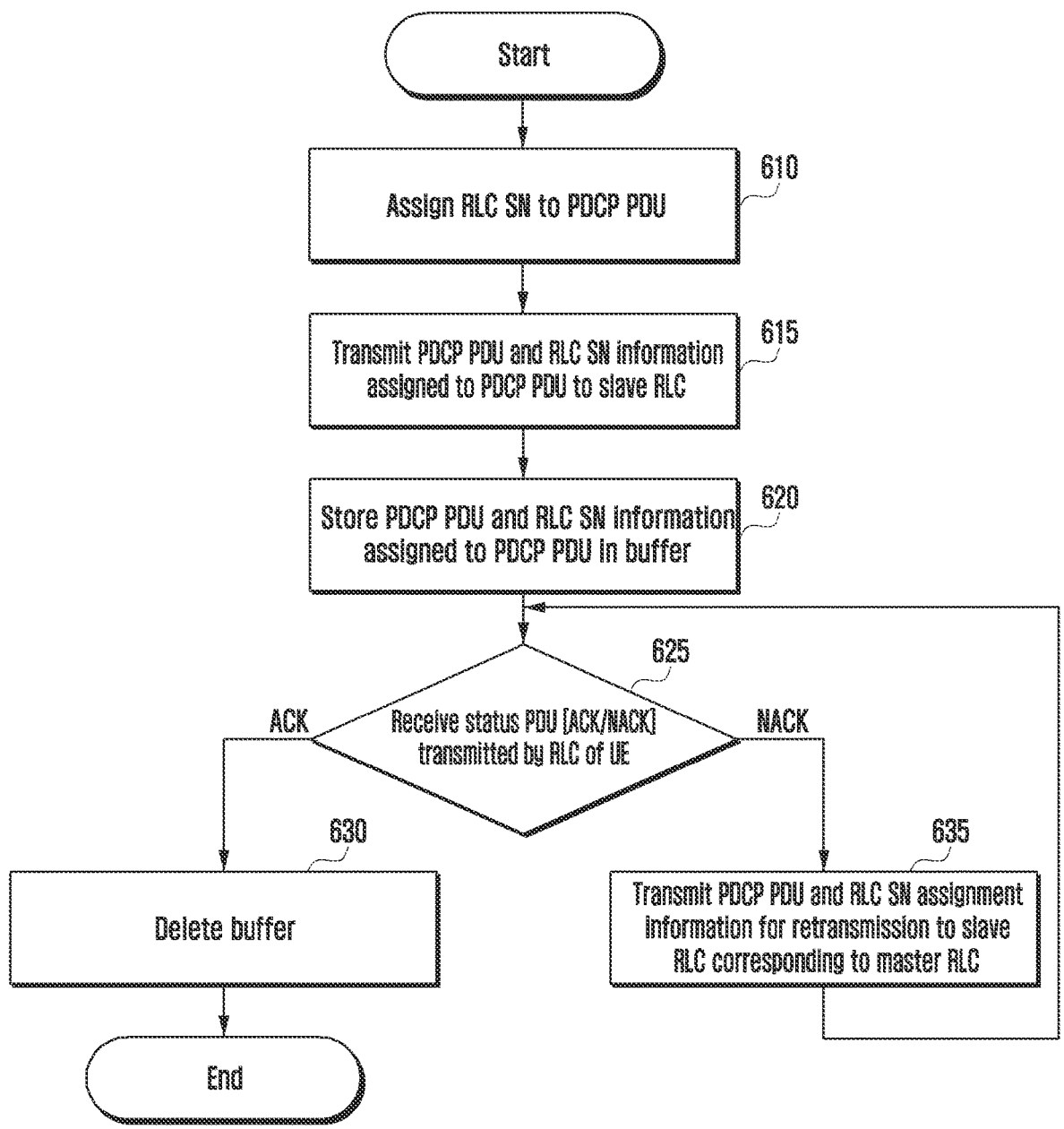
FIG. 6 is a flowchart showing an operation of the master RLC of a first base station in which retransmission is taken into consideration according to an embodiment of the disclosure.

FIG. 6 is a flowchart showing an operation of the master RLC of a primary base station (e.g., 310, 410) in which retransmission is taken into consideration according to an embodiment of the disclosure.

At step 610, the master RLC assigns an RLC SN to a PDCP PDU. In this case, the PDCP PDU has been transmitted by the PDCP. The master RLC distributes the PDCP PDU and assigns the RLC SN, based on information (e.g., a BO size and data rate in each base station) obtained from the slave RLC.

At step 615, the master RLC transmits the PDCP PDU and the RLC SN information assigned to the PDCP PDU to the slave RLC of each base station. The slave RLC of each base station obtains the PDCP PDU and the RLC SN information assigned to the PDCP PDU, and performs data transmission to a terminal by transmitting part of or the entire pre-assignment RLC PDU or a combination thereof to the MAC based on the results of the resource allocation of the MAC.

At step 620, the master RLC stores the PDCP PDU and the RLC SN information assigned to the PDCP PDU in a buffer. Step 620 may be performed prior to step 615, and may be performed simultaneously with step 615.

At step 625, the master RLC obtains a status PDU, including ACK/NACK information for the transmitted data, from the RLC of the terminal.

At step 625, if ACK is received, at step 630, the master RLC deletes the PDCP PDU and RLC SN information assigned to the PDCP PDU, stored in the buffer at step 620, and the process is terminated. The master RLC may continue to assign an RLC SN by deleting data whose transmission completion has been acknowledged and a corresponding RLC SN.

At step 625, if NACK is received, at step 635, the master RLC transmits the PDCP PDU and the RLC SN assignment information, stored in the buffer for retransmission, to the slave RLC of the base station that manages the master RLC. In an embodiment of the disclosure, the master/slave RLC structure may be applied to the virtualization of a base station if the reliability of a backhaul is guaranteed. In this case, the master RLC and the slave RLC may be configured on separate network entities, and the master RLC may transmit, to one slave RLC corresponding to the master RLC, a corresponding PDCP PDU and RLC SN assignment information stored in a buffer for retransmission.

After the retransmission, ACK/NACK (status PDU) for the retransmitted data is obtained from the RLC of the UE again (625). The process proceeds to step 630 or step 635 based on obtained contents. The repetition of step 625 and step 635 is not infinite and may be terminated if a given time elapses or there is no PDCP PDU to be transmitted.

Figure 7:
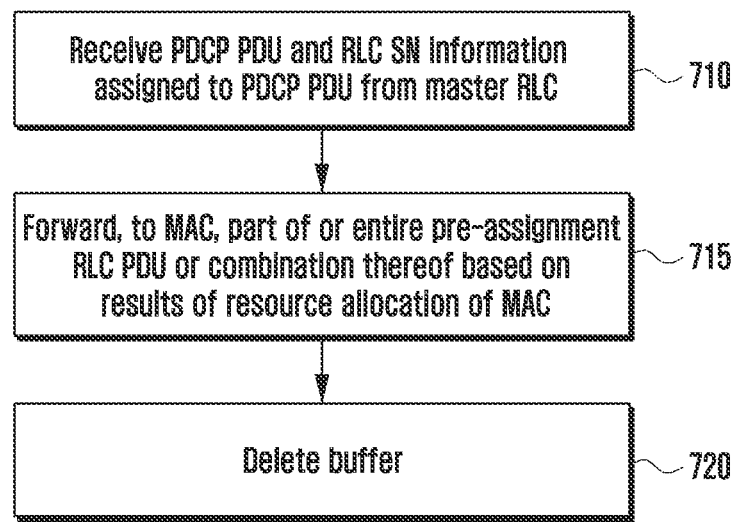
FIG. 7 is a diagram showing an operation of the slave RLC of a second base station according to an embodiment of the disclosure.

FIG. 7 is a diagram showing an operation of the slave RLC of a secondary base station according to an embodiment of the disclosure.

At step 710, the slave RLC of a secondary base station different from a primary base station operating a master RLC obtains a PDCP PDU and RLC SN information assigned to the PDCP PDU from the master RLC of the primary base station.

At step 715, the slave RLC forwards, to the MAC, part of or the entire pre-assignment RLC PDU or a combination thereof based on the results of the resource allocation of the MAC using the PDCP PDU and the RLC SN information, assigned to the PDCP PDU, obtained from the master RLC.

After part of or the entire pre-assignment RLC PDU or a combination thereof is transmitted to the MAC, the slave RLC deletes a buffer at step 720. The reason for this is that the master RLC of a primary base station takes full charge of ARQ retransmission as described above. Accordingly, a memory region that is physically necessary when the slave RLC of a secondary base station is implemented can be reduced.

Figure 8:
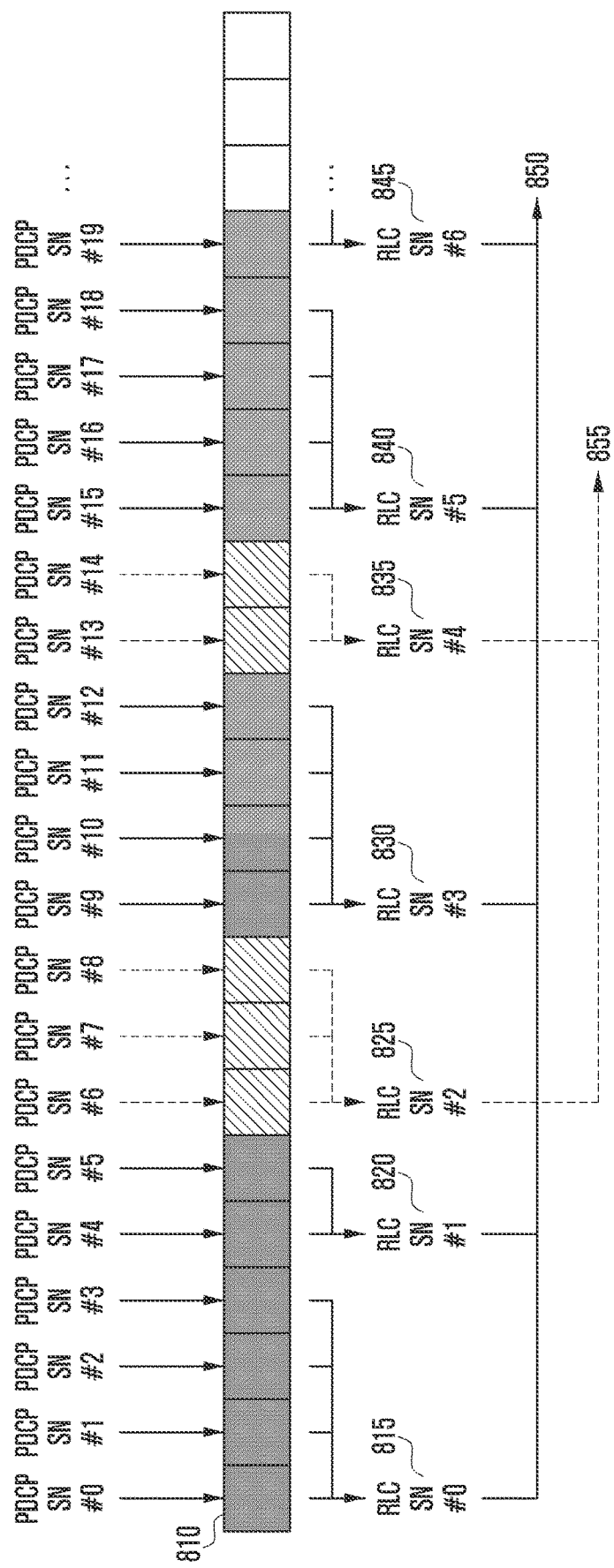
FIG. 8 is a diagram showing an RLC SN assignment method according to an embodiment of the disclosure.

FIG. 8 is a diagram showing an RLC SN assignment method according to an embodiment of the disclosure.

A master RLC distributes a PDCP PDU 810 based on information from a slave RLC, and determines a PDCP PDU set to be forwarded to each base station. According to an embodiment of the disclosure, the master RLC may collect and manage information in order to perform an algorithm for distributing a PDCP PDU to each base station. The information may include at least one of a BO size or data rate in each base station or latency between base stations, for example.

If the PDCP PDU set to be forwarded to each base station is determined, the master RLC configures RLC PDUs by assigning (815, 820, 825, 830, 835, 840, 845) RLC SNs to respective sets. In an embodiment of the disclosure, a method of first assigning an SN to a PDCP PDU obtained from a PDCP before an RLC PDU is generated and forwarded to a MAC as described above is called RLC SN pre-assignment.

The master RLC may determine the size of a PDCP PDU set to which the same RLC SN is assigned in performing RLC SN assignment on a distributed PDCP PDU. For example, the size of an accumulated PDCP PDU set to which the same RLC SN is assigned may be determined every slave RLC in which a PDCP PDU will be transmitted, may be determined in proportion to the data rate of each slave RLC, or may be determined in proportion to electric field information using CQI/RI information of each serving cell that is obtained in a PCell.

The PDCP PDU to which the RLC SN has been assigned as described above is transmitted (850, 855) to the slave RLC of each base station along with RLC SN assignment information. For example, in this drawing, the PDCP PDUs 815, 820, 830, 840, and 845 may be transmitted to the slave RLC of a primary base station that manages a master RLC, and the PDCP PDUs 825 and 835 may be transmitted to the slave RLC of a secondary base station.

In this drawing, the RLC SN has been assigned as the unit of the number of PDCP PDUs, for convenience of an expression, but the disclosure is not limited thereto and may be implemented in various ways. For example, an RLC SN may be assigned in a byte offset level of a PDCP PDU for the optimization of performance. More specifically, in this case, the RLC SN may be assigned to some data of a PDCP PDU to which a byte offset has been applied.

Figure 9:
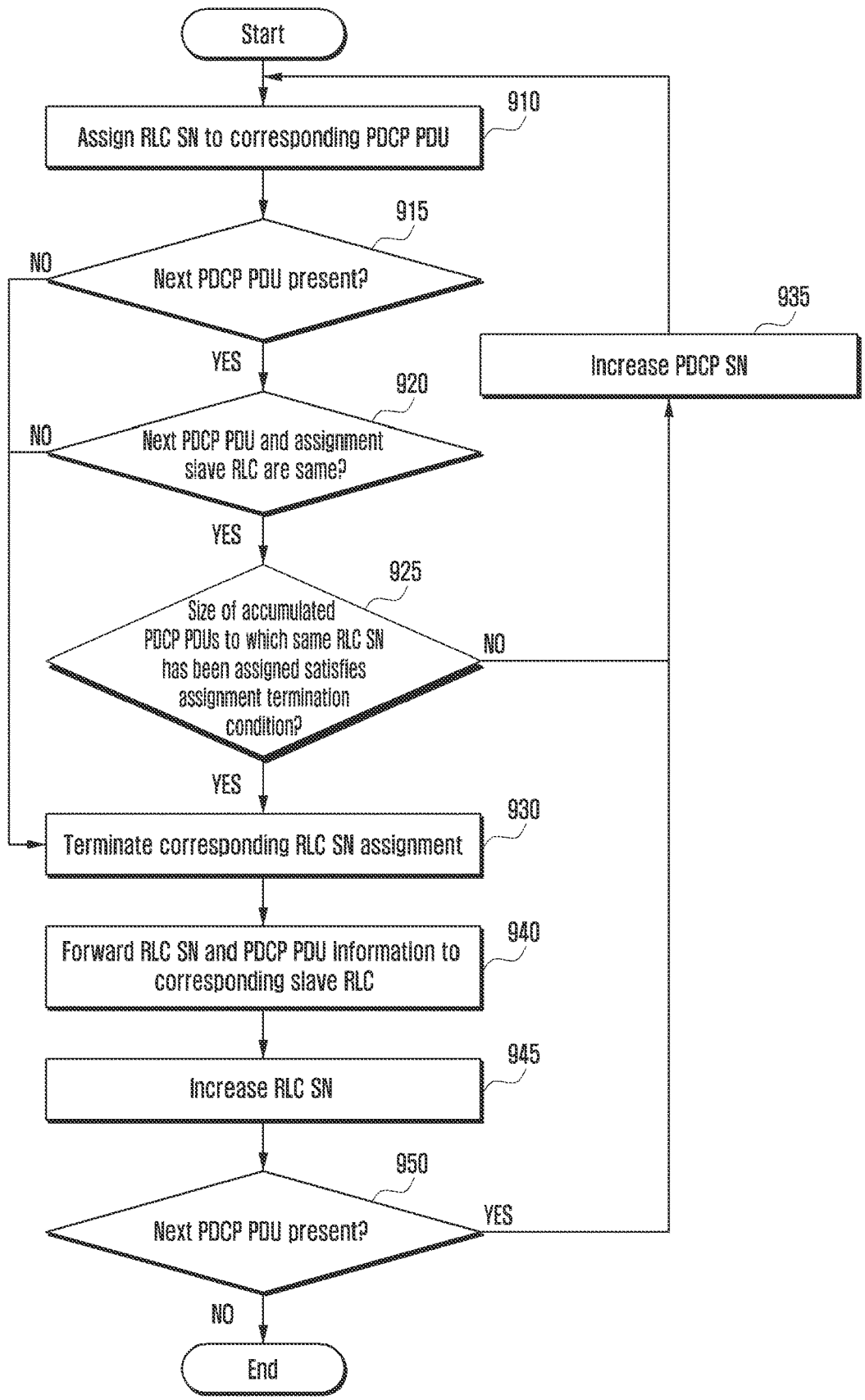
FIG. 9 is a flowchart showing an algorithm for RLC SN pre-assignment according to an embodiment of the disclosure.

FIG. 9 is a flowchart showing the algorithm for RLC SN pre-assignment described in FIG. 8.

Steps of FIG. 9 may be performed in a master RLC for each radio bearer, and are performed on a PDCP PDU set to which an RLC SN has not yet been assigned.

At step 910, the master RLC assigns a corresponding RLC SN to a corresponding PDCP PDU to which an RLC SN has not yet been assigned.

At step 915, the master RLC determines whether a next PDCP PDU to which an RLC RN will be assigned is present.

If a next PDCP PDU is present, at step 920, the master RLC determines whether the corresponding PDCP PDU and the next PDCP PDU are transmitted to the same slave RLC.

If the corresponding PDCP PDU and the next PDCP PDU are transmitted to the same slave RLC, at step 925, the master RLC determines whether the size of accumulated PDCP PDUs to which the corresponding RLC SN has been assigned exceeds a predetermined PDCP PDU set size for each RLC SN. According to an embodiment of the disclosure, the size of a PDCP PDU set for each RLC SN may be determined every slave RLC in which a PDCP PDU will be transmitted, may be determined in proportion to the data rate of each slave RLC, or may be determined in proportion to electric field information using CQI/RI information of each serving cell that is obtained in a PCell.

If it is determined that the size of accumulated PDCP PDUs to which the same RLC SN has been assigned does not exceed the PDCP PDU size for each the RLC SN at step 925, the master RLC increases the SN of a PDCP PDU, returns to step 910 in which assignment is performed using the same RLC SN, and performs a next step.

If a PDCP PDU on which RLC SN assignment will be performed is not present at step 915, a next PDCP PDU is transmitted to a slave RLC different from that of a PDCP PDU to which an RLC SN has been previously assigned at step 920, or it is determined that the size of accumulated PDCP PDUs to which the same RLC SN has been assigned exceeds the predetermined PDCP PDU size for each RLC SN at step 925, corresponding RLC SN assignment is terminated (930), and a PDCP PDU for which assignment has been terminated and RLC SN assignment information are transmitted to a corresponding slave RLC (940).

In order to assign a new RLC SN, the master RLC increases the RLC SN (945) and determines whether a next PDCP PDU is present (950). If a next PDCP PDU is present, the master RLC may increase a PDCP PDU SN, may return to step 910, and may assign the increased RLC SN at step 945.

If it is determined that a next PDCP PDU is not present at step 950, the assignment process is terminated. When an RLC SN is subsequently assigned to a PDCP PDU, an RLC SN increased at step 945 is assigned.

Although step 940 has been illustrated as being subsequent to step 930, step 940 may be prior to step 930 and the two steps may be performed at the same time.

Figure 10:
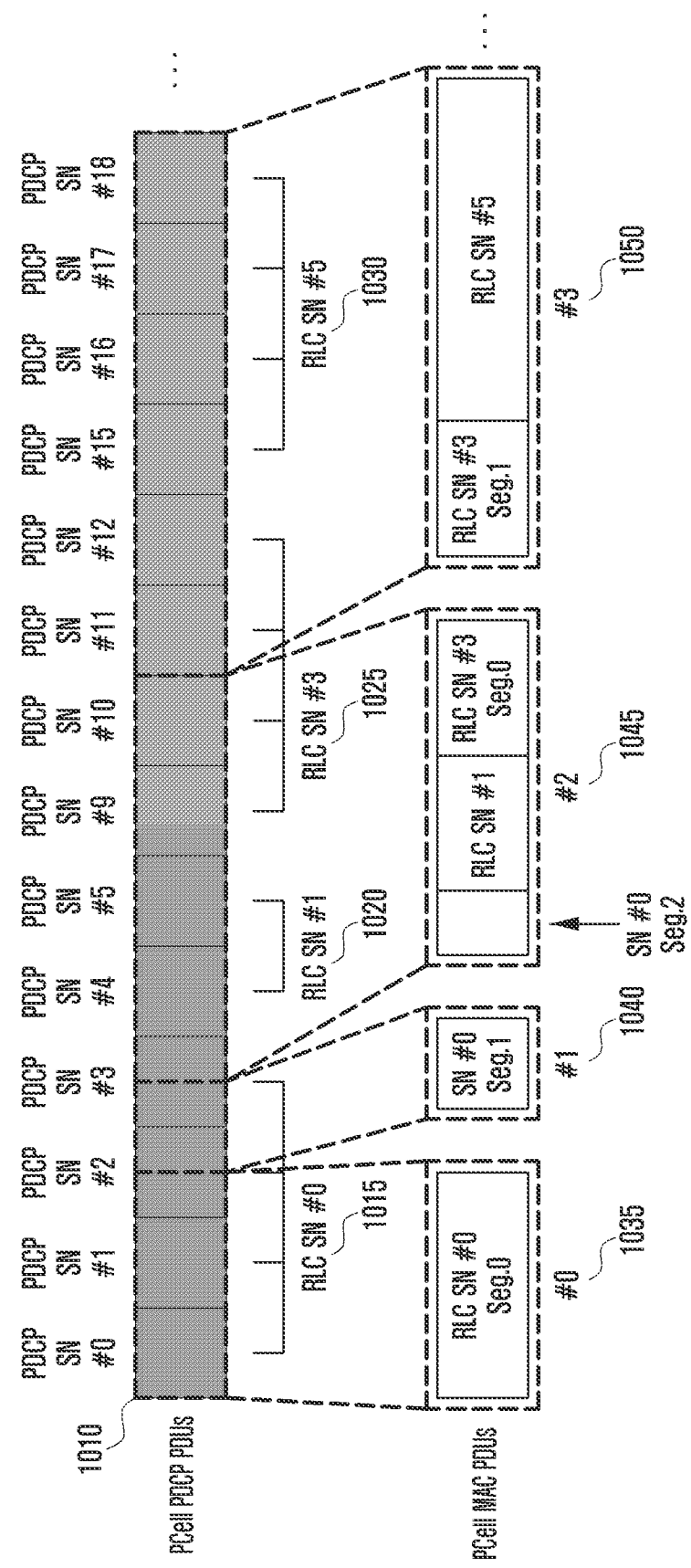
FIG. 10 is a diagram showing an operation in a slave RLC.

FIG. 10 is a diagram showing an operation in a slave RLC in brief.

The slave RLC may be the slave RLC of the primary base station that has obtained the PDCP PDUs 815, 820, 830, 840, and 845 in FIG. 8, for example.

The slave RLC obtains an RLC PDU (PCP PDU and PCP PDU-RLC SN assignment information) 1010 from a master RLC.

The slave RLC provides part of or the entire obtained RLC PDU or combinations thereof 1035, 1040, 1045, and 1050 based on the results of the resource allocation of the MAC.

According to an embodiment of the disclosure, RLC SN assignment has already been performed on the PDCP PDU in the master RLC prior to PDU segmentation. RLC PDU sets to which the same RLC SN has been assigned may be segmented due to the PDU segmentation.

For example, a PDCP PDU set 1015 to which an RLC SN #0 has been assigned may be segmented into three by PDU segmentation, thus becoming an RLC SN #0 Seg. 0, an RLC SN #0 Seg. 1 and an RLC SN #0 Seg. 2. The RLC SN #0 Seg. 0 and the RLC SN #0 Seg. 1 may configure (1035 and 1040) respective MAC PDUs as RLC PDU segmentations. The RLC SN #0 Seg. 2 may configure (1045) one MAC PDU through a combination of another RLC PDU (RLC SN #1) and RLC PDU segmentation (RLC SN #3 Seg. 0).

Figure 11:
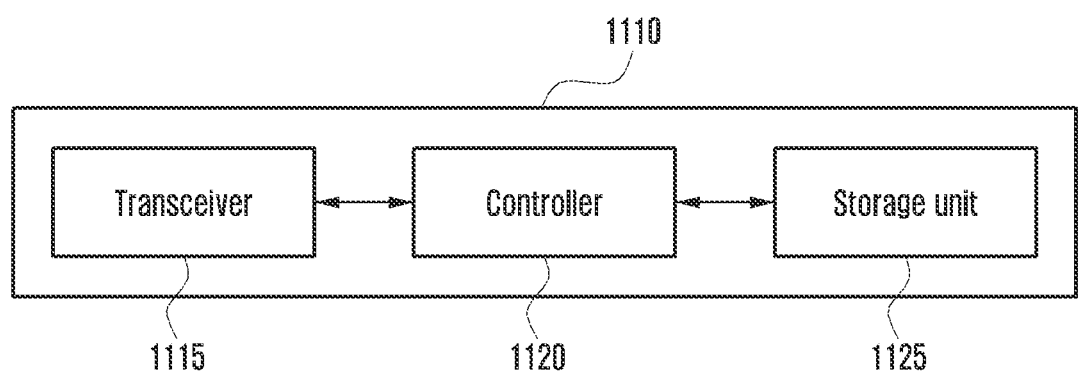
FIG. 11 is a diagram showing a master RLC according to various embodiments of this specification.

FIG. 11 is a diagram showing a master RLC 1110 according to various embodiments of this specification.

Referring to FIG. 11, the master RLC 1110 according to an embodiment includes a transceiver 1115, a controller 1120 and a storage unit 1125.

The transceiver 1115 may transmit and receive signals to and from a slave RLC and another entity. According to an embodiment of the disclosure, the transceiver 1115 may obtain a PDCP PDU from a PDCP, may obtain information (a BO size, a data rate, etc.) for the distribution of the PDCP PDU from the slave RLC, and may transmit the PDCP PDU and RLC SN assignment information to the slave RLC.

The storage unit 1125 may store at least one of information related to the slave RLC or information transmitted and received through the transceiver 1115. According to an embodiment of the disclosure, the storage unit may store a PDCP PDU to which an RLC SN has been assigned and assignment information thereof for subsequent retransmission.

The controller 1120 may control the operation of the master RLC, and may control the entire master RLC so that the operations described in the embodiment and related to the master RLC can be performed. The controller 1120 may include at least one processor.

The preferred embodiments of the disclosure have been disclosed in this specification and drawings. Although specific terms have been used in this specification and drawings, they are used in common meanings in order to easily describe the technical contents of the disclosure and to help understanding of the disclosure, but are not intended to limit the scope of the disclosure. It is evident to a person having ordinary skill in the art to which the disclosure pertains that other modified examples based on the technical spirit of the disclosure are possible in addition to the disclosed embodiments.

What is claimed is:

1. A method performed by a base station in a wireless communication system supporting a carrier aggregation operation, the method comprising:
    generating packet data convergence protocol (PDCP) protocol data units (PDUs);
    allocating a first radio link control (RLC) sequence number (SN) to a first PDCP PDU of the generated PDCP PDUs;
    identifying whether a second PDCP PDU of the generated PDCP PDUs and the first PDCP PDU are associated with a same RLC layer;
    allocating a second RLC SN to the second PDCP PDU, in case that the second PDCP PDU and the first PDCP PDU are not associated with the same RLC layer;
    determining whether a size of accumulated PDCP PDUs to which the first RLC SN is allocated is larger than a predetermined value, in case that the second PDCP PDU and the first PDCP PDU are associated with the same RLC layer;
    allocating the first RLC SN to the second PDCP PDU, in case that the size of the accumulated PDCP PDUs to which the first RLC SN is allocated is equal to or less than the predetermined value; and
    allocating the second RLC SN to the second PDCP PDU, in case that the size of the accumulated PDCP PDUs to which the first RLC SN is allocated is larger than the predetermined value.

2. The method of claim 1,
    wherein, in case that the second PDCP PDU and the first PDCP PDU are not associated with the same RLC layer, the first PDCP PDU to which the first RLC SN is allocated is transferred to a first RLC layer and the second PDCP PDU to which the second RLC SN is allocated is transferred to a second RLC layer, and
    wherein the first RLC layer and the second RLC layer are associated with the carrier aggregation operation.

3. The method of claim 1, further comprising obtaining data distribution information for the carrier aggregation operation,
    wherein the predetermined value is based on the data distribution information, and
    wherein the data distribution information includes at least one of information on a buffer occupancy (BO) size or information on a data rate.

4. The method of claim 1, wherein the allocation of the first RLC SN is terminated, in case that the second PDCP PDU and the first PDCP PDU are not associated with the same RLC layer or the size of the accumulated PDCP PDUs to which the first RLC SN is allocated is larger than the predetermined value.

5. The method of claim 4, further comprising storing, in a buffer, the first PDCP PDU to which the first RLC SN is allocated and RLC SN allocation information associated with the first RLC SN, in case that the allocation of the first RLC SN is terminated.

6. The method of claim 4, further comprising transferring, to a corresponding RLC layer, the first PDCP PDU to which the first RLC SN is allocated and RLC SN allocation information associated with the first RLC SN, in case that the allocation of the first RLC SN is terminated.

7. A method performed by a master radio link control (RLC) layer of a base station in a wireless communication system supporting a carrier aggregation operation, the method comprising:
obtaining, from a packet data convergence protocol (PDCP) layer of the base station, PDCP protocol data units (PDUs);
allocating a first RLC sequence number (SN) to a first PDCP PDU of the obtained PDCP PDUs;
identifying whether a second PDCP PDU of the obtained PDCP PDUs and the first PDCP PDU are associated with a same slave RLC layer;
allocating a second RLC SN to the second PDCP PDU, in case that the second PDCP PDU and the first PDCP PDU are not associated with the same slave RLC layer;
determining whether a size of accumulated PDCP PDUs to which the first RLC SN is allocated is larger than a predetermined value, in case that the second PDCP PDU and the first PDCP PDU are associated with the same slave RLC layer;
allocating the first RLC SN to the second PDCP PDU, in case that the size of the accumulated PDCP PDUs to which the first RLC SN is allocated is equal to or less than the predetermined value; and
allocating the second RLC SN to the second PDCP PDU, in case that the size of the accumulated PDCP PDUs to which the first RLC SN is allocated is larger than the predetermined value.

8. The method of claim 7,
wherein, in case that the second PDCP PDU and the first PDCP PDU are not associated with the same slave RLC layer, the first PDCP PDU to which the first RLC SN is allocated is transferred to a first slave RLC layer and the second PDCP PDU to which the second RLC SN is allocated is transferred to a second slave RLC layer, and
wherein the first slave RLC layer and the second slave RLC layer are associated with the carrier aggregation operation.

9. A base station in a wireless communication system supporting a carrier aggregation operation, the base station comprising:
a transceiver; and
a controller coupled with the transceiver and configured to:
generate packet data convergence protocol (PDCP) protocol data units (PDUs),
allocate a first radio link control (RLC) sequence number (SN) to a first PDCP PDU of the generated PDCP PDUs,
identify whether a second PDCP PDU of the generated PDCP PDUs and the first PDCP PDU are associated with a same RLC layer,
allocate a second RLC SN to the second PDCP PDU, in case that the second PDCP PDU and the first PDCP PDU are not associated with the same RLC layer,
determine whether a size of accumulated PDCP PDUs to which the first RLC SN is allocated is larger than a predetermined value, in case that the second PDCP PDU and the first PDCP PDU are associated with the same RLC layer,
allocate the first RLC SN to the second PDCP PDU, in case that the size of the accumulated PDCP PDUs to which the first RLC SN is allocated is equal to or less than the predetermined value, and
allocate the second RLC SN to the second PDCP PDU, in case that the size of the accumulated PDCP PDUs to which the first RLC SN is allocated is larger than the predetermined value.

10. The base station of claim 9,
wherein, in case that the second PDCP PDU and the first PDCP PDU are not associated with the same RLC layer, the first PDCP PDU to which the first RLC SN is allocated is transferred to a first RLC layer and the second PDCP PDU to which the second RLC SN is allocated is transferred to a second RLC layer, and
wherein the first RLC layer and the second RLC layer are associated with the carrier aggregation operation.

11. The base station of claim 9,
wherein the controller is further configured to obtain data distribution information for the carrier aggregation operation,
wherein the predetermined value is based on the data distribution information, and
wherein the data distribution information includes at least one of information on a buffer occupancy (BO) size or information on a data rate.

12. The base station of claim 9, wherein the allocation of the first RLC SN is terminated, in case that the second PDCP PDU and the first PDCP PDU are not associated with the same RLC layer or the size of the accumulated PDCP PDUs to which the first RLC SN is allocated is larger than the predetermined value.

13. The base station of claim 12, wherein the controller is further configured to store, in a buffer, the first PDCP PDU to which the first RLC SN is allocated and RLC SN allocation information associated with the first RLC SN, in case that the allocation of the first RLC SN is terminated.

14. The base station of claim 12, wherein the controller is further configured to transfer, to a corresponding RLC layer, the first PDCP PDU to which the first RLC SN is allocated and RLC SN allocation information associated with the first RLC SN, in case that the allocation of the first RLC SN is terminated.

15. A master radio link control (RLC) layer of a base station in a wireless communication system supporting a carrier aggregation operation, the master RLC layer comprising:
a transceiver; and
a controller coupled with the transceiver and configured to:
obtain, from a packet data convergence protocol (PDCP) layer of the base station, PDCP protocol data units (PDUs),
allocate a first RLC sequence number (SN) to a first PDCP PDU of the obtained PDCP PDUs,
identify whether a second PDCP PDU of the obtained PDCP PDUs and the first PDCP PDU are associated with a same slave RLC layer,
allocate a second RLC SN to the second PDCP PDU, in case that the second PDCP PDU and the first PDCP PDU are not associated with the same slave RLC layer, determine whether a size of accumulated PDCP PDUs to which the first RLC SN is allocated is larger than a predetermined value, in case that the second PDCP PDU and the first PDCP PDU are associated with the same slave RLC layer, allocate the first RLC SN to the second PDCP PDU, in case that the size of the accumulated PDCP PDUs to which the first RLC SN is allocated is equal to or less than the predetermined value, and allocate the second RLC SN to the second PDCP PDU, in case that the size of the accumulated PDCP PDUs to which the first RLC SN is allocated is larger than the predetermined value.

16. The master RLC layer of claim 15, wherein, in case that the second PDCP PDU and the first PDCP PDU are not associated with the same slave RLC layer, the first PDCP PDU to which the first RLC SN is allocated is transferred to a first slave RLC layer and the second PDCP PDU to which the second RLC SN is allocated is transferred to a second slave RLC layer, and wherein the first slave RLC layer and the second slave RLC layer are associated with the carrier aggregation operation.

* * * * *